(12) United States Patent
Chen

(10) Patent No.: US 8,378,971 B2
(45) Date of Patent: Feb. 19, 2013

(54) WIRELESS MOUSE

(75) Inventor: Cheng-Chi Chen, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 844 days.

(21) Appl. No.: 12/541,135

(22) Filed: Aug. 13, 2009

(65) Prior Publication Data

US 2011/0012833 A1    Jan. 20, 2011

(51) Int. Cl.
*G09G 5/08* (2006.01)
*G06F 3/033* (2006.01)
(52) U.S. Cl. .................... 345/163; 345/156; 345/166
(58) Field of Classification Search ........... 345/156–173
See application file for complete search history.

(56) References Cited

U.S. PATENT DOCUMENTS

| | | | | |
|---|---|---|---|---|
| 5,657,051 A * | 8/1997 | Liao | ............... | 345/163 |
| 7,119,793 B2 * | 10/2006 | Chen | ............... | 345/166 |
| 2005/0057511 A1 * | 3/2005 | Wang | ............... | 345/166 |
| 2007/0252816 A1 * | 11/2007 | Yen | ............... | 345/163 |
| 2008/0024448 A1 * | 1/2008 | Chang | ............... | 345/166 |
| 2009/0009475 A1 * | 1/2009 | Schuette | ............... | 345/163 |

* cited by examiner

*Primary Examiner* — Viet Pham
(74) *Attorney, Agent, or Firm* — Altis Law Group, Inc.

(57) ABSTRACT

A wireless mouse includes a switch unit arranged between a circuit board and a lower cover of the wireless mouse. The circuit board defines two electrical connection contacts which can control to provide power for the wireless mouse. The switch unit can make the electrical connection contacts be connected to each other in response to the wireless mouse is pressed by a user. The switch unit also can make the electrical connection contacts be not connected to each other in response to the wireless mouse is not pressed by a user.

7 Claims, 4 Drawing Sheets

WIRELESS MOUSE

BACKGROUND

1. Technical Field

The present disclosure relates to pointing devices and, particularly, to a wireless mouse.

2. Description of Related Art

Wireless mice are used with many devices, such as computer systems. An ordinary wireless mouse may include a battery circuit for supplying power and a power switch to switch the battery circuit. However, some users may forget to turn off the power switch when they are done using the mouse, which is a waste of electrical energy.

DETAILED DESCRIPTION

Figure 1:
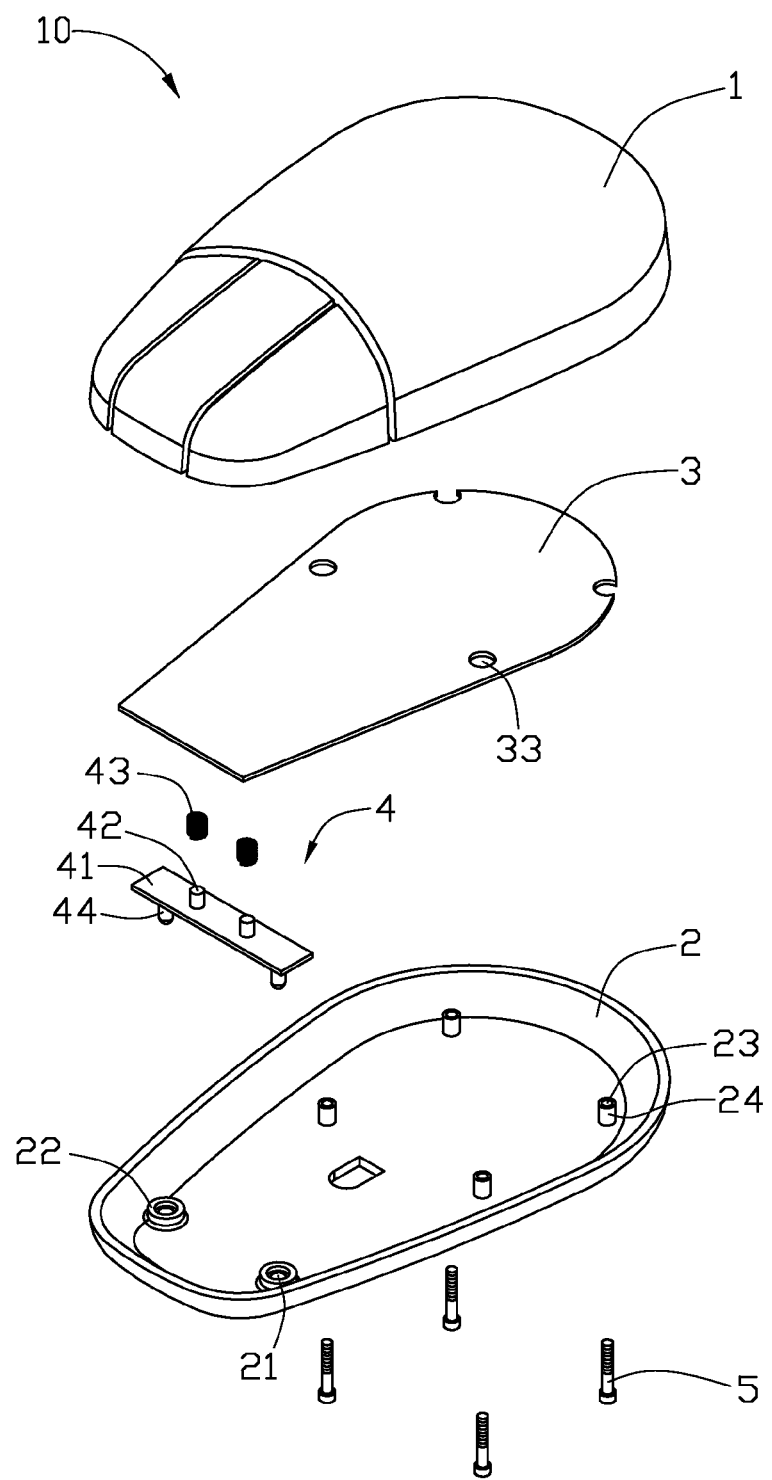
FIG. 1 is an exploded, isometric view of an exemplary embodiment of a wireless mouse.
Figure 2:
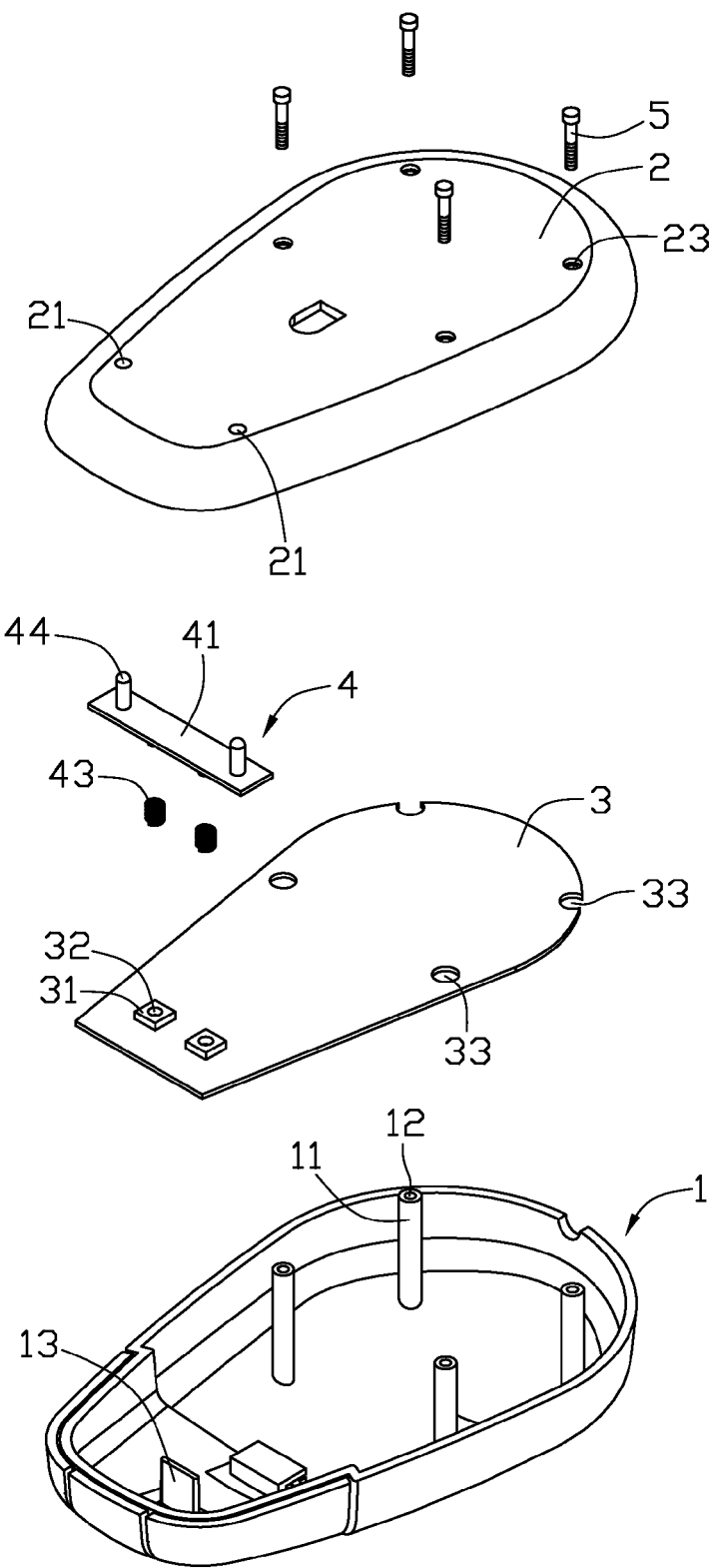
FIG. 2 is an inverted view of FIG. 1.

Referring to FIGS. 1 and 2, an exemplary embodiment of a wireless mouse 10 includes an upper cover 1, a lower cover 2 engaging with the upper cover 1, a circuit board 3, and a switch unit 4.

The circuit board 3 includes two protrusions 31 extending from an end of a bottom of the circuit board 3. Four though holes 33 are defined in the circuit board 3. A limiting hole 32 is defined in each of the two protrusions 31. It may be understood that the circuit board 3 may include some mouse circuits, such as a battery circuit, and an operation circuit connected to the battery circuit, for example. These circuits are well-known circuits, and so are not described here. The circuit board 3 further includes two electrical connection contacts 34 (see FIG. 4) respectively received in the two limiting holes 32. When the two electrical connection contacts 34 are connected to each other, the wireless mouse 10 can be powered by the battery circuit, otherwise, the wireless mouse 10 cannot be powered by the battery circuit.

The switch unit 4 includes an electric board 41 and two springs 43. Two electric poles 42 extend from a top of the electric board 41, corresponding to the two limiting holes 32 of the circuit board 3. Two extending poles 44 extend from a bottom of the electric board 41.

Two raised portions 22 extend from an end of an inner wall of the lower cover 2, corresponding to the two extending poles 44 of the switch unit 4. The two raised portions 22 each define a through hole 21. The two extending poles 44 of the circuit unit 4 are operable to pass through the corresponding through holes 21. Four positioning posts 24 extend from the inner wall of the lower cover 2, corresponding to the four though holes 33 of the circuit board 3. The four positioning posts 24 each define a through hole 23 therein.

Four positioning poles 11 extend from an inner wall of the upper cover 1, corresponding to the four though holes 33 of the circuit board 3. The four positioning poles 11 each define a screw hole 12 therein. A resisting portion 13 extends from an end of the inner wall of the upper cover 1, for resisting against the circuit board 3.

Figure 3:
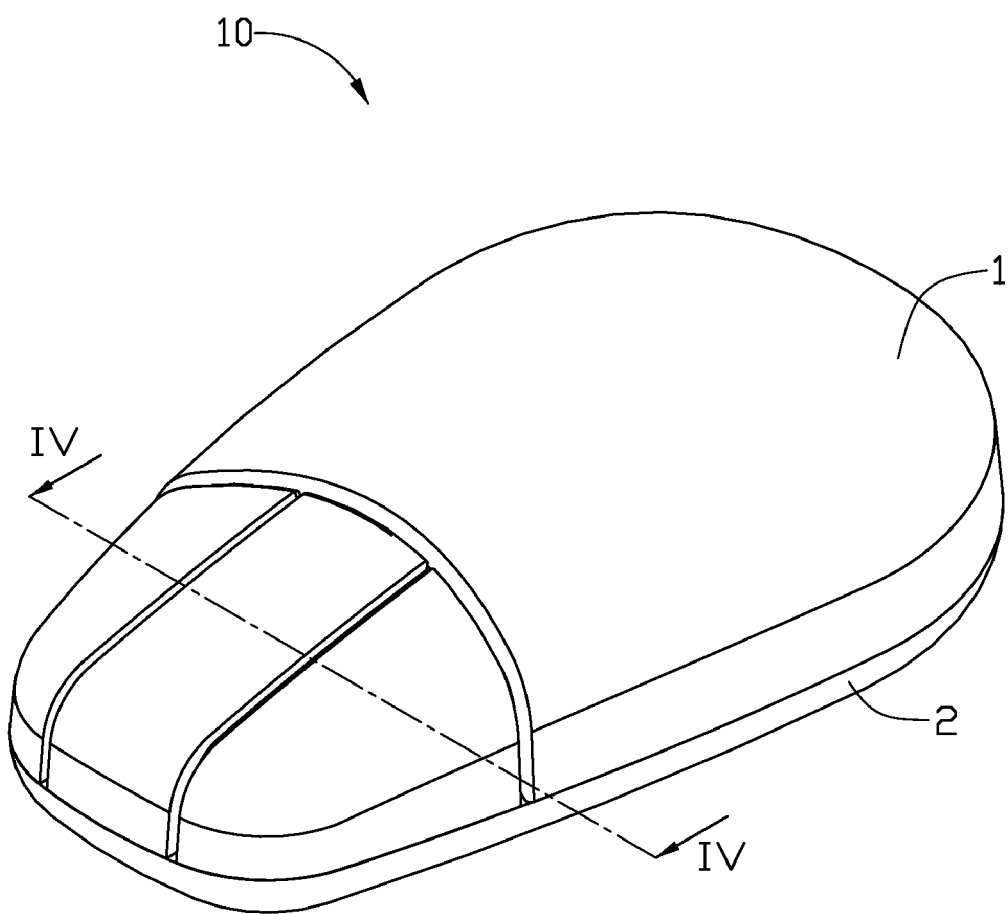
FIG. 3 is an assembled, isometric view of the wireless mouse of FIG. 1.
Figure 4:
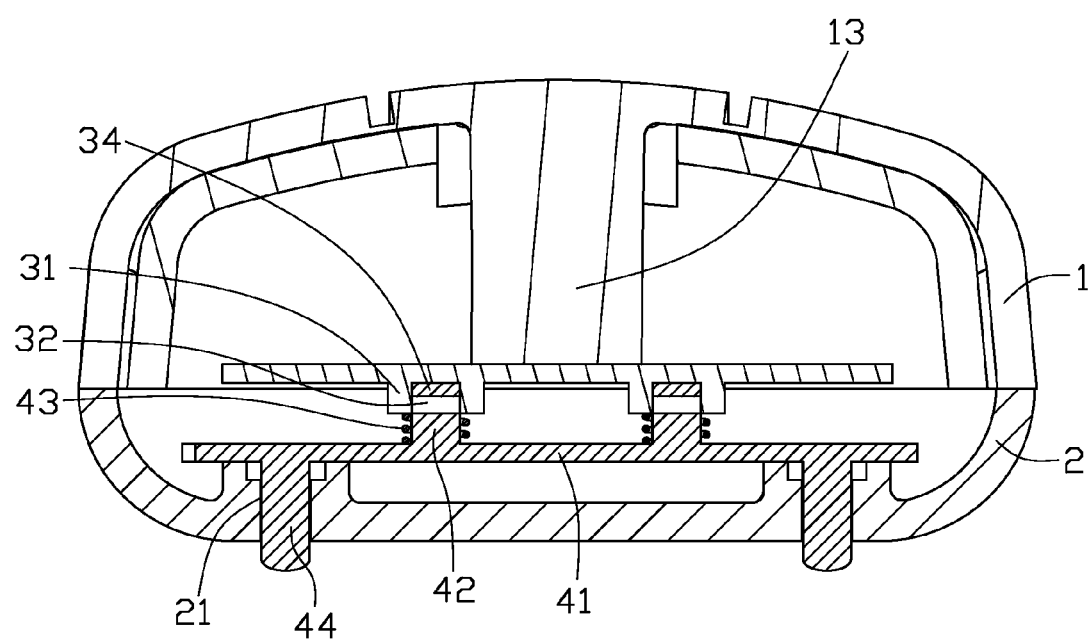
FIG. 4 is a cross-sectional view of the wireless mouse of FIG. 3, taken along the line IV-IV.

Referring to FIGS. 3 and 4, in assembly, the two extending poles 44 of the switch unit 4 are inserted into the through holes 21 of the lower cover 2. The springs 43 fit about the corresponding electric poles 42 of the switch unit 4. The circuit board 3 is placed in the lower cover 2, here, the two limiting holes 32 of the circuit board 3 align with the corresponding electric poles 42 of the switch unit 4, and the four though holes 33 of the circuit board 3 align with the corresponding positioning posts 24 of the lower cover 2. The springs 43 are sandwiched between the circuit board 3 and the electric board 41 of the switch unit 4. The upper cover 1 is engaged with the lower cover 2, here, the four positioning poles 11 of the cover 1 pass through the corresponding through holes 33 of the circuit board to align with the corresponding positioning posts 24 of the lower cover 2. Four screws 5 are inserted into the through holes 23 of the positioning posts 24 to engage in the screw holes 12 of the positioning poles 11. The resisting portion 13 of the upper cover 1 resists against a top of the circuit board 3.

When the wireless mouse 10 is not in use, that is, no hand of a user is pressing on top of the mouse 10, the springs 43 drives the electric board 41 towards the lower cover 2, and the two electric poles 42 cannot touch the corresponding electrical connection contacts 34. At this time, the wireless mouse 10 cannot be powered, and no energy is wasted although a user did not switch the mouse 10 off. When the wireless mouse 10 is used, that is the top of the mouse 10 is pressed by a hand of the user, the resisting portion 13 of the upper cover 1 drives the circuit board 3 to move towards the lower cover 2, the springs 43 are compressed and the two electric poles 42 of the switch unit 4 touch the corresponding electrical connection contacts 34. At this time, the two electrical connection contacts 34 are electrically connected via the electric board 41 and the electric poles 42, thus the wireless mouse 10 is powered and ready for use.

Because the wireless mouse 10 can be automatically turned off via the switch unit 4 when it is not in use, thus saving electrical energy effectively and conveniently.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A wireless mouse, comprising:
   a lower cover;
   an upper cover covered on the lower cover to bound a receiving space;
   a circuit board accommodated in the receiving space, and comprising two electrical connection contacts, wherein the circuit board is powered in response to the two electrical connection contacts being connected to each other; and
   a switch unit comprising two electric poles corresponding to the two electrical connection contacts of the circuit board, the switch unit being elastically arranged between the lower cover and the circuit board, wherein the two electrical connection contacts are connected to each other in response to the two electric poles contacting the two electrical connection contacts respectively, the two electric poles contact the two electrical connection contacts in response to the upper cover is pressed by a user.

2. The wireless mouse of claim 1, wherein the circuit board further comprises two protrusions extending from an end of a bottom of the circuit board, the circuit board defines four though holes therein, a limiting hole is defined in each of the two protrusions, the two electrical connection contacts are respectively received in the two limiting holes.

3. The wireless mouse of claim 2, wherein the switch unit further comprises an electric board and two springs fitting about the corresponding electric poles to provide elasticity between the lower cover and the circuit board, the two electric poles extend from a top of the electric board, corresponding to the two limiting holes of the circuit board.

4. The wireless mouse of claim 3, wherein two extending poles extend from a bottom of the electric board, two raised portions extend from an inner wall of the lower cover corresponding to the extending poles of the electric board, the two raised portions each defines a through hole, the two extending poles pass through the through holes of the corresponding raised portions.

5. The wireless mouse of claim 4, wherein a resisting portion extends from the inner wall of the upper cover, to resist against the top of the circuit board.

6. The wireless mouse of claim 3, wherein four positioning poles extend from an inner wall of the upper cover to the circuit board define four first though holes to fit about the corresponding positioning poles.

7. The wireless mouse of claim 6, wherein four positioning posts extend from the inner wall of the lower cover, each positioning post defines a second through hole, each positioning pole of the upper cover defines a screw hole, wherein a screw is inserted into the second through hole of each positioning post of the lower cover to engage with the screw hole of a corresponding positioning pole of the upper cover.

* * * * *

UNITED STATES PATENT AND TRADEMARK OFFICE
CERTIFICATE OF CORRECTION

| | | |
|---|---|---|
| PATENT NO. | : 8,378,971 B2 | Page 1 of 1 |
| APPLICATION NO. | : 12/541135 | |
| DATED | : February 19, 2013 | |
| INVENTOR(S) | : Cheng-Chi Chen | |

It is certified that error appears in the above-identified patent and that said Letters Patent is hereby corrected as shown below:

Title Page, below Item (65) insert

-- (30)    Foreign Application Priority Data

Jul. 20 2009    (CN) ..........................2009 1 0304518 --

Signed and Sealed this
Thirteenth Day of May, 2014

Michelle K. Lee
*Deputy Director of the United States Patent and Trademark Office*